(12) United States Patent
Chan et al.

(10) Patent No.: US 7,728,528 B2
(45) Date of Patent: Jun. 1, 2010

(54) ELECTRONIC BALLAST WITH PREHEATING AND DIMMING CONTROL

(75) Inventors: Cho Sing Chan, Kowloon (HK); Ronald J. Bezdon, Schaumburg, IL (US)

(73) Assignee: Century Concept Ltd, Hong Kong (CN)

( * ) Notice: Subject to any disclaimer, the term of this patent is extended or adjusted under 35 U.S.C. 154(b) by 246 days.

(21) Appl. No.: 11/568,340

(22) PCT Filed: Nov. 29, 2005

(86) PCT No.: PCT/CN2005/002050

§ 371 (c)(1),
(2), (4) Date: Oct. 26, 2006

(87) PCT Pub. No.: WO2006/056143

PCT Pub. Date: Jun. 1, 2006

(65) Prior Publication Data

US 2008/0042588 A1      Feb. 21, 2008

Related U.S. Application Data

(60) Provisional application No. 60/631,192, filed on Nov. 29, 2004.

(51) Int. Cl.
*H05B 37/02* (2006.01)

(52) U.S. Cl. .................. 315/224; 315/291; 315/276; 315/DIG. 5

(58) Field of Classification Search .......... 315/224, 315/225, 226, 209 R, 291, 307, DIG. 4, DIG. 5, 315/DIG. 7, 274, 276
See application file for complete search history.

(56) References Cited

U.S. PATENT DOCUMENTS

| 4,240,009 A | 12/1980 | Paul |
| 4,484,108 A | 11/1984 | Stupp et al. |
| 4,723,098 A | 2/1988 | Grubbs |

(Continued)

FOREIGN PATENT DOCUMENTS

CN      2034761      3/1989

(Continued)

OTHER PUBLICATIONS

PCT International Search Report and Written Opinion for PCT Application No. PCT/CN2005/002050 mailed on Mar. 9, 2006, 9 pgs.

*Primary Examiner*—Douglas W Owens
*Assistant Examiner*—Ephrem Alemu
(74) *Attorney, Agent, or Firm*—Lee & Hayes, PLLC

(57) ABSTRACT

A ballast circuit for controlling preheating, ignition or performing dimming of a gas discharge lamp such as a compact fluorescent lamp is disclosed. The ballast circuit has an inverter connected to a pair of input terminals for receiving a supply voltage, a base drive transformer connected to the switching transistor inverter to provide a drive signal, a resonant circuit connected to the switching transistor inverter, and a loading circuit connected to the base drive transformer. The base drive transformer includes a primary winding and a secondary winding set. The loading circuit is adapted for at least temporarily saturating the base drive transformer and thus effecting in the resonant circuit an oscillating frequency different from a natural resonant frequency of the resonant circuit.

21 Claims, 8 Drawing Sheets

U.S. PATENT DOCUMENTS

| | | | |
|---|---|---|---|
| 4,857,806 A * | 8/1989 | Nilssen | 315/72 |
| 5,117,161 A * | 5/1992 | Avrahami | 315/226 |
| 5,396,155 A * | 3/1995 | Bezdon et al. | 315/291 |
| 5,434,479 A | 7/1995 | Ohnishi et al. | |
| 5,444,333 A | 8/1995 | Lau | |
| 5,583,399 A | 12/1996 | Rudolph | |
| 5,656,891 A | 8/1997 | Luger et al. | |
| 5,729,096 A | 3/1998 | Liu et al. | |
| 5,920,155 A | 7/1999 | Kanda et al. | |
| 5,945,788 A | 8/1999 | Li et al. | |
| 5,959,408 A | 9/1999 | Steel et al. | |
| 6,031,342 A | 2/2000 | Ribarich et al. | |
| 6,140,779 A | 10/2000 | Kanazawa et al. | |
| 6,181,085 B1 | 1/2001 | Nilssen | |
| 6,348,769 B1 | 2/2002 | Pinchuk et al. | |
| 6,377,000 B2 | 4/2002 | Kim | |
| 6,400,584 B1 | 6/2002 | Sabate et al. | |
| 6,417,630 B1 | 7/2002 | Simpelaar | |
| 6,501,225 B1 | 12/2002 | Konopka | |
| 6,677,718 B2 | 1/2004 | Chen et al. | |
| 6,696,803 B2 | 2/2004 | Tao et al. | |
| 6,744,219 B2 | 6/2004 | Neidlinger | |
| 2004/0046513 A1 | 3/2004 | Onn Fah | |

FOREIGN PATENT DOCUMENTS

| | | |
|---|---|---|
| DE | 3511661 A1 | 10/1986 |
| EP | 0092654 A2 | 11/1983 |
| EP | 0114370 A1 | 8/1984 |
| EP | 00441253 A1 | 8/1991 |
| EP | 00463387 A2 | 1/1992 |
| EP | 00463387 A3 | 1/1992 |
| EP | 00463387 B1 | 12/1995 |
| EP | 00748146 A1 | 12/1996 |
| EP | 01040733 B1 | 7/1999 |
| EP | 00752804 B1 | 12/1999 |
| EP | 00748146 B1 | 8/2001 |
| JP | 7274524 | 10/1995 |
| JP | 2004134333 A2 | 4/2004 |
| WO | WO9851130 A1 | 11/1998 |
| WO | WO9934650 A1 | 7/1999 |
| WO | WO0024233 A2 | 4/2000 |
| WO | WO0024233 A3 | 4/2000 |

* cited by examiner

ELECTRONIC BALLAST WITH PREHEATING AND DIMMING CONTROL

PRIORITY

This application claims the benefit of U.S. Provisional Application No. 60/631,192, filed Nov. 29, 2004, which is incorporated by reference herein in its entirety.

FIELD OF THE INVENTION

The present invention relates to ballasts of gas discharge lamps such as fluorescent lamps, and more particularly to electronic ballast circuits for controlling preheating sequence or dimming performance of a gas discharge lamp during startup and steady operation.

BACKGROUND OF THE INVENTION

Gas discharge lamps are a family of artificial light sources that operate on very different physics principles than incandescent lamps. While incandescent lamps generate light by heating a metal filament until it glows white hot, gas discharge lamps send an electric current through a special gas to generate light. Depending on the type of gas or mixture used, this either generates visible light directly or first generates ultra-violet light and then converts the ultraviolet light to visible light using phosphors such as fluorescent powders or coatings. Both types of gas discharge lamps have significant commercial applications. The former (generating light directly) are commonly used as park and roadway lighting, while the latter (generating light indirectly), particularly fluorescent lamps, have even broader applications due to their better control and rendering of the light colors generated.

Compared to conventional incandescent lamps, gas discharge lamps offer long life, low tube temperature and high light efficiency. For this reason, gas discharge lamps, particularly fluorescent lamps, provide a large percentage of today's lighting needs, even though they are more complicated to manufacture and require electronics to provide the correct current flow through the gas. The compact fluorescent lamp is perhaps the best known gas discharge lamp and is becoming an increasingly significant substitute of conventional incandescent lamps in both industrial and home applications.

The operation of a standard gas discharge lamp is accomplished by ionizing the mercury vapor enclosed in the lamp by applying a high voltage between two filaments (also called cathodes or electrodes) located at each end of the lamp. During ignition, the temperature of emissive coating of the filaments is increased to an optimum level for emission of electrons and to heat the mercury vapor near the filaments. Unlike incandescent light sources, gas discharge light sources will not be able to start if directly connected to a regular voltage resource. In addition, most gas discharge lighting sources, including the fluorescent lamps, exhibit negative resistance characteristics in operation, meaning that the lamp voltage is higher and the current lower when the lamp is operating at a lower power, and conversely, the lamp voltage is lower and the current higher when the lamp is operating at a higher power. The negative resistance characteristics may result in an unstable operation if the lamp is directly connected to the voltage source.

For these reasons, a fixture called ballast is used with a gas discharge lamp to perform necessary ignition and stabilization. Among the two major types of ballasts, namely electromagnetic ballasts and electronic ballasts, electronic ballasts are of particular importance. While an electromagnetic lamp ballast uses electromagnetic induction to provide the proper starting and operating electrical condition to power gas discharge lamp, an electronic lamp ballast uses solid state electronic circuitry to do the same. Because electronic ballasts usually use inverter style power supplies to rectify the input power and then chop it at a high frequency, they can change the frequency of the power from the standard mains frequency to 20,000 Hz or higher, which significantly increases the efficiency of gas discharge lamps and substantially eliminates the stroboscopic effect associated with fluorescent or high-intensity discharge lighting. In recent years, due to the significant efficiency improvements and further support by the rapid developments of semiconductor manufacturing technology and high-frequency switching technology, electronic ballasts are becoming more and more dominant in gas discharge lamps.

A ballast performs its functions by regulating the voltage and current during various stages of the lamp operation such as preheating, ignition and normal operation. Ballasts for gas discharge lamps are often classified according to the method of creating the ignition condition. These categories include instant-start, rapid-start, preheat-start and program-start ballasts. Depending on the type of gas discharge lamps and other design requirements, one type of ballasts may be found more suitable than another.

Instant-start ballasts skip the preheating stage and go directly to ignition and normal operation. For this reason, instant-start ballasts, including some quasi instant-start circuits (further described below) commonly used in energy efficient lighting products, do not require a control circuitry for preheating. In an instant-start ballast, the increase in filament temperature necessary for ignition is accomplished by allowing a high voltage applied across the lamp and the two filaments (e.g., 1000 volts peak) to establish an arc, thereby heating the filaments with the arc current. Circuits for this type of ballasts usually have the lamp connected across (in parallel with) a high-voltage source which is commonly a resonant circuit. A current path through the filaments is generally not provided. In fact, it is common for an instant-start ballast to have only two connections to the lamp, one at each end. A quasi-instant start circuit is similar in operation to the instant start circuit except that the quasi-instant start circuit allows the resonant current of the ballast to run through the lamp filaments (typically for disabling high-voltage generation by the resonant circuit during lamp removal), but like the instant-start circuit, does not have a preheating stage and therefore has no control for performing preheating.

In contrast, preheat-start and program-start ballasts heat the filaments separately to emission temperatures by allowing current to flow through the filaments themselves for a limited period of time (e.g., one second or less) before a moderately high voltage (e.g., 500 volts RMS) is applied across the lamp to ignite the lamp. Because circuits for these ballasts provide a current path through the lamp filaments for preheating, they may require a control circuit to perform a desired preheating procedure, and often have four connections to the lamp, two at each filament end of the lamp.

There are many circuit variations and implementations for these basic starting techniques in use in the industry today. Attributes such as cost, lamp life, ballast size, application and the number of connections to the lamp all affect the starting method adopted. For example, due to their typically lower costs and higher efficiencies, instant and quasi-instant start circuits are extensively used in the low-cost and energy-saving lighting market where the low cost and high efficiency drive the selection of the ignition method. In some cases, the instant-start operation can not only lower initial product costs but also produce slightly greater energy efficiency (i.e., light output per watt), since no filament heating power is delivered to the filament during normal operation of the lamp. For this reason, instant-start ballasts are most often selected for general office space lighting where large numbers of lamps are used and the lamps are not frequently switched on and off. For other low-cost energy-efficient applications, for example where low-cost is combined with the need for lowering output voltages during lamp removal or filament failure, the user may choose a quasi-instant start circuit.

However, the short lamp life is a major drawback of energy-saving light fixtures using instant or quasi-instant ballasts, particularly when used in situations where frequent lamp starting is required (as in bathrooms or areas where motion sensors are installed). This makes ballasts that perform some sort of preheating before ignition preferred in many applications. It is generally known that the preheat-start approach can result in significantly longer lamp life due to the separate heating of the filaments before ignition, which results in reduced degradation of the lamp filament's emissive coating during the ignition sequence.

On the other hand, preheat-start approach generally requires additional circuitry in order to reduce the filament heating power used during normal operation and hence may add additional cost (as compared to instant-start and quasi-instant start circuits). The ballasts with a preheating function currently available in the market are larger in size due to a significantly more complex circuit topologies and are expensive. It is therefore desirable to introduce a low-cost simplified circuit for implementing the preheating function into a ballast circuit. In addition, even for ballasts that do not perform preheating, it is often desirable to have a low-cost solution for features such as dimming function during normal operation.

SUMMARY OF THE INVENTION

This application discloses a ballast circuit for controlling preheating, ignition or performing dimming of a gas discharge lamp such as a compact fluorescent lamp. The inventive ballast circuit provides a built-in dynamic and/or adjustable frequency control to perform various functions such as preheating, ignition and dimming. In contrast to conventional electronic ballast circuits which rely on linear performance of the transformers and complicated control circuits to change frequencies, the present invention takes advantage of the non-linear properties of a drive transformer in a saturated condition to alter the drive signals, thereby allowing the circuit to oscillate at frequencies other than its natural resonant frequency.

In one embodiment, the ballast circuit has a switching transistor inverter, a base drive transformer, a resonant circuit, and a loading circuit applying a load to the base drive transformer. The switching transistor inverter is connected to a pair of input terminals for receiving a supply voltage. The base drive transformer is connected to the switching transistor inverter to provide a drive signal. The resonant circuit is connected to the switching transistor inverter. The resonant circuit also connects to the gas discharge lamp to power the lamp. The loading circuit is connected to the base drive transformer. The base drive transformer includes a primary winding and a secondary winding set. The loading circuit is adapted for at least temporarily saturating the base drive transformer and thus effecting in the resonant circuit an oscillating frequency different from a natural resonant frequency of the resonant circuit.

The secondary winding set of the base drive transformer may further include a loading winding connected to the loading circuit and a secondary winding subset. In one embodiment, the secondary winding subset includes a first secondary winding connected to a first bipolar transistor of the switching transistor inverter and a second secondary winding connected to a second bipolar transistor of the switching transistor inverter. The switching transistor inverter may be a half-bridge switching transistor inverter.

In one embodiment, the loading circuit applies a dynamic load changing with time during a startup of the ballast circuit. The dynamic load saturates the base drive transformer during an initial portion of the startup of the ballast circuit. This results in oscillating frequencies higher than the natural resonant frequency $f_0$ of the resonant circuit to create a controlled dynamic preheating and ignition condition.

The loading circuit may include an R-C timing circuit having a timing resistor R and a timing capacitor C. The values of R and C, together with the number of turns N of a loading winding of the base drive transformer, are determined according to desired startup timing characteristics of the ballast circuit.

In another embodiment, the loading circuit applies an adjustable loading during an operation stage of the gas discharge lamp to perform a dimming function. The adjustable loading may be adjusted by changing a control voltage or by changing resistance of a variable resistor or a potentiometer in the loading circuit.

The present application also discloses a gas discharge lamp assembly, which includes a gas discharge lamp and a ballast circuit having a dynamic loading circuit for controlling preheating and ignition of the gas discharge lamp. The gas discharge lamp may be a fluorescent lamp, such as a compact fluorescent lamp. The loading circuit may also apply an adjustable loading during an operation stage of the gas discharge lamp to perform a dimming function.

The present invention potentially allows for a cheaper and more compact electronic ballast suitable for gas discharge lamps, particularly for compact fluorescent lamps.

The foregoing and other features and advantages will become more apparent from the following detailed description of several embodiments, which proceeds with reference to the accompanying figures.

BRIEF DESCRIPTION OF THE FIGURES

FIG. 10 shows an illustrative diagram of the relationship between the switching frequency of the ballast circuit of FIG. 8 and the resistance value of the venerable resistor VR1 after the loading transistor Q4 is turned on.

DETAILED DESCRIPTION

Figure 1:
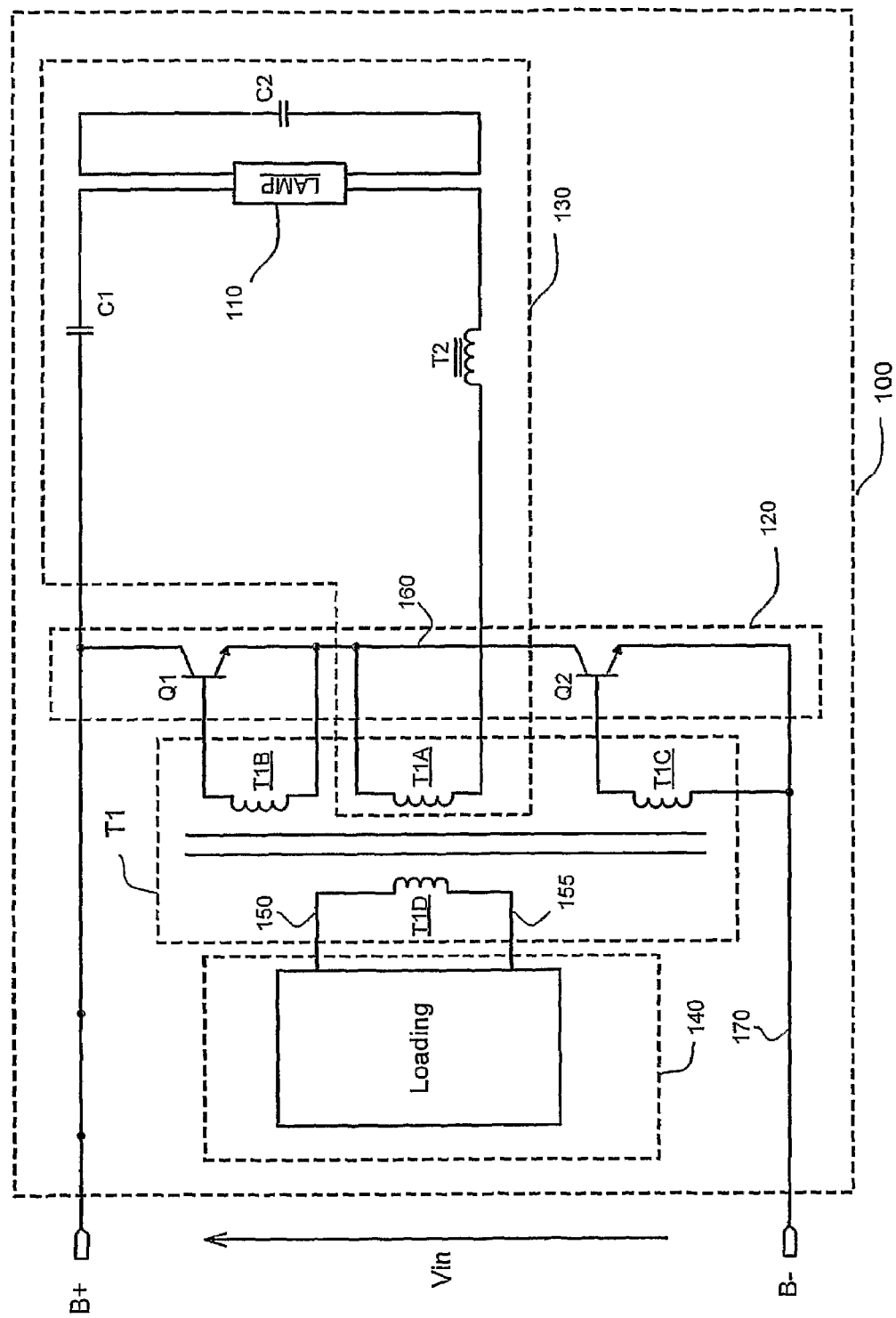
FIG. 1 shows a circuit model of an embodiment of a ballast that employs preheating or dimming control in accordance with the present invention.

The ballast circuit in accordance with the present invention for controlling preheating, ignition or performing dimming of a gas discharge lamp such as a compact fluorescent lamp will be described in detail along with the figures, in which like parts are denoted with like reference numerals or letters.

FIG. 1 shows an equivalent circuit model of an embodiment of a ballast that employs preheating and/or dimming control in accordance with the present invention. The ballast includes a ballast circuit 100 for powering a gas discharge lamp 110. The ballast circuit 100 has positive and negative DC input terminals B+ and B− for receiving a DC supply voltage. Additionally, the ballast circuit 100 includes, as represented by the circuit blocks of FIG. 1, an inverter 120, a base drive transformer T1, a resonant circuit 130 and a drive transformer loading circuit 140.

The inverter 120 is connected to the input terminals B+ and B−. The base drive transformer T1 is connected to the inverter 120 to provide a drive signal. The base drive transformer T1 includes a primary winding T1A and a secondary winding set, which as shown in the embodiment shown in FIG. 1 includes a first secondary winding T1B base drive winding, a second secondary winding T1C base drive winding and a third secondary winding T1D. The loading circuit 140 is connected through AC input terminals 150 and 155 to the third secondary winding T1D of the base drive transformer T1. In this configuration, the third secondary winding T1D functions as a drive transformer loading winding.

The switching transistors of inverter 120 as embodied in FIG. 1 are connected as a half-bridge switching transistor inverter having a first bipolar transistor Q1 connected at its collector electrode to the positive DC input terminal B+. The first bipolar transistor Q1 has an emitter electrode connected to node 160. The first secondary winding T1B is the base drive winding connected across the base-emitter junctions of the first bipolar transistor Q1. The inverter 120 also includes a second bipolar transistor Q2 having a collector electrode connected to node 160. The second bipolar transistor Q2 has an emitter electrode connected to terminal 170. The second secondary winding T1C is the base drive winding connected across the base-emitter junctions of the second bipolar transistor Q2.

The resonant circuit 130 has a DC blocking capacitor C1, a resonant capacitor C2, and a resonant inductor T2, all connected in series through the primary winding T1A of the base drive transformer T1 and placed between the DC input terminal B+ and node 160. Via node 160, the resonant circuit 130 is connected to the switching transistor inverter 120. In application, the resonant circuit 130 connects directly to the filaments (not shown) of a gas discharge lamp 110 to power the lamp 110.

One important characteristic of the ballast circuit 100 is that the loading circuit 140 is adapted for at least temporarily saturating the base drive transformer T1 to cause the resonant circuit 130 to be driven at an oscillating frequency different from a natural resonant frequency $f_0$ of the resonant circuit 130.

As will be further described below, the ballast circuit 100 in accordance with the present invention takes advantage of the nonlinear properties of the base drive transformer T1 in saturation to provide a unique way to control the inverter operation to set preheating, ignition and other operation (such as operation levels including dimming function during normal operation) of the gas discharge lamp 110. Variation, switching or "sweeping" of the frequencies is made possible by the unique loading circuit 140 that can control the saturation of the base drive transformer T1, without requiring complicated frequency control circuitry for frequency variation. The loading circuit 140 can be designed such that it applies either a dynamic load or an adjustable load, or both, to the drive transformer. When the loading circuit 140 is designed to apply a dynamic load to the base drive transformer T1, it causes the ballast circuit 100 to generate an automatic and predetermined preheat-start sequence to start the gas discharge lamp 110. If the design of the loading circuit 140 is modified to apply an adjustable load to the base drive transformer T1 during the normal operation of the ballast circuit 100, the oscillating frequency of the inverter 120 is changed accordingly to effecting a variable output power of the gas discharge lamp 110, thus providing a dimming function to the gas discharge lamp 110.

As known in the art, preheat-start (including program-start) ballast circuits and some of the quasi instant-start ballast circuits allow a current to run through the filaments of the lamp. Such a ballast circuit is commonly driven by a resonant circuit and inverter switches. For example, it is common to utilize a transformer circuit to provide drive information to inverter switches in a ballast circuit. The transformer provides drive signals to the inverter transistors through transformer coupling of the resonant current in an output stage. As the resonant current starts to flow, a positive signal is given to one of the transistors. As the resonant current increases and then decreases, eventually reversing direction (as is natural for a resonant condition), the transformer drive signal also increases, decreases and reverses. This reversed signal will then turn off the drive transistor that has been on and apply a positive signal to another transistor on the opposite side of the drive stage. Repetition of this process creates an oscillating condition at the resonant circuit's natural resonant frequency.

In a ballast circuit that has a resonant circuit, the current that runs through the filaments is affected by the magnitude of the resonant current. It is thus appreciated that the current through the filaments may be controlled by changing the magnitude of the resonant current. If the current through the filaments is used for preheating the filaments, the preheating level may be controlled by controlling the magnitude of resonant current. Similarly, the output power of the gas discharge lamp during normal operation may also be controlled by controlling the magnitude of resonant current to perform a dimming function.

On the other hand, the magnitude of the current of a resonant circuit is dependent on the frequency and/or duty cycle of the drive circuitry. The preheating level and/or dimming level can therefore be controlled by varying the frequency of the drive signals in the switching stage. During preheating, the frequency of the drive signals in the switching stage may be varied in a certain range such that the resonant circuit generates a sufficient filament current to raise the temperature of the filaments, thereby preparing the gas discharge lamp for ignition. At ignition, both the filament temperature and the signal frequency reaches proper levels to assure that the gas discharge lamp can be ignited. After ignition, the gas discharge lamp reaches a steady state for normal operation, during which the output power of the gas discharge lamp may be controlled by varying the frequency of the drive signals in the switching stage. In this manner all three stages (i.e., preheating, ignition and normal operation) of lamp operation can be performed.

In this regard, the present invention provides a novel circuit and method of controlling the main inverter frequency with very simple circuitry that can be made at low costs. The present invention utilizes some of the non-linear properties of a transformer in a saturated condition to alter the drive signals, thereby allowing the circuit to oscillate at frequencies other than the resonant frequency of the resonant stage. In contrast, conventional ballast circuits depend on true, linear transformer operation to give the transistors drive signals. Where the frequency of the drive signals needs to be changed, conventional ballast circuits typically use a special frequency control circuit to bring about the needed frequency change. (Some conventional ballasts, such as quasi instant-start circuit, may be driven by a fixed frequency inverter and run at a single fixed frequency.)

With the disclosure herein, it will be clear that the ballast circuit 100 in accordance with the present invention may be used in any ballast to control the startup stages (preheating and ignition) and/or normal operation by controlling the frequency and/or duty cycle of a switching stage (such as a half bridge transistor inverter as shown in FIG. 1 or full bridge switch or any other suitable switching means) driving a resonant circuit. This is further described below with reference to the figures.

Referring back to FIG. 1 which shows an exemplary embodiment in accordance with the present invention, it is appreciated that if the drive transformer T1 is allowed to be saturated at some point during the cycle, the drive signal coupled to the switching transistors Q1 and Q2 of the inverter 120 will be changed. At the point of saturation, the drive signal starts to significantly decrease, allowing the driven transistor (Q1 or Q2, depending on the phase of the cycle) to start to turn off before the completion of the resonant cycle. The effect of turning off the driven transistor (Q1 or Q2) of the inverter 120 causes a drop in the current in the resonant inductor T2 and hence an earlier reversal of the resonant current direction. This early reversal of the resonant current causes a change in the frequency characteristics of the drive signals such that the resonant circuit 130 now oscillates at a frequency at or above its natural resonant frequency $f_o$.

It is thus appreciated that the oscillating frequency of the inverter 120 and correspondingly that of the resonant circuit 130 may be controlled by controlling the point, degree and duration of the saturation of the base drive transformer T1. The ballast circuit 100 in accordance with the present invention controls the saturation of the base drive transformer T1 by controlling a "loading" applied on the base drive transformer T1. The control of the loading in turn is realized using the loading circuit 140 coupled to the base drive transformer T1 through the loading winding T1D. The loading applied by the loading circuit 140 changes, or can be made to change, as a function of time to provide different conditions during startup. These conditions include the point (in time domain) of saturation, the duration of saturation, and the degree of saturation of the transformer T1.

The added load by the loading circuit 140 increases the overall load across the base drive transformer T1. This increased load, when sufficient, causes the base drive transformer T1 to saturate. Once the base drive transformer T1 is saturated, further increasing the added load applied by the loading circuit 140 results in an incrementally higher inverter frequency. Conversely, decreasing the added load applied by the loading circuit 140 results in a lower inverter frequency until linear transformer operation is again achieved. In the linear region of the transformer, the feedback provided from the resonant current of the resonant circuit 130 again provides the natural drive frequency information to the inverter 120 and its switching transistors Q1 and Q2.

As the inverter frequency driving the resonant circuit 130 changes from a sufficiently high frequency to a lower frequency to approach the natural resonant frequency of the resonant circuit 130, both preheating and ignition are realized. When the inverter frequency is much higher than the natural frequency, the resonant circuit may present a high inductive characteristic, resulting in small resonant current. As the inverter frequency decreases to become closer to the natural resonant frequency, however, the resonant current (which contributes to a preheating current in the filaments of the gas discharge lamp 110) increases. Proper timing of this stage will result in a desired amount of preheating by the ballast circuit 100 until it reaches an ignition condition, which is when the resonant current has heated the filaments to a sufficiently high temperature for emission and a sufficiently high voltage develops across the lamp for ignition by the decreasing frequency and the increasing resonant current. After ignition, the ballast circuit 100 may be operated at a steady working frequency (or operation frequency) to output a desired lamp power.

It is appreciated that the ballast circuit 100 is only an exemplary embodiment of the present invention. Those skilled in the art will recognize that various features and aspects of the above-described disclosure may be using different circuitry designs. For example, although the inventor 120 is shown to be directly connected to the input terminals B+ and B−, they may also be connected indirectly with intervening components or circuitry (such as a power factor correction module) in between. For another example, the loading winding T1D as shown in the embodiment in FIG. 1 is a separate winding added to the drive transformer T1 (separate from the primary winding T1A and other secondary windings T1B and T1C). This particular configuration is not required in principle. In addition, although the secondary winding set in the exemplary ballast circuit 100 includes three secondary windings (the secondary winding subset T1B and T1C, and the additional secondary winding T1D which is a loading winding), in principle the secondary winding set (and the secondary winding subset) may include any number (such as one, two, three or more) of secondary windings. However, a separate loading winding T1D as shown in the ballast circuit 100 of FIG. 1 is preferred so that a load can be introduced without affecting normal operation of the base drive transformer T1 and the inverter 120. When isolated from the other ballast circuitry, the loading winding T1D allows the introduction of a simple load and loading control circuit at minimal cost.

In a steady working condition, the load by the loading circuit 140 may still be adjusted to change the inverter frequency of the ballast circuit 100 and hence control the light output of the lamp. It is thus possible to perform a dimming function to adjust the light output with an adjustable loading.

If further control is desired, additional circuitry can be added to the loading circuit 140 to provide enhanced or more accurate controls. In addition to controlling the magnitude of the resonant current by controlling the frequency, it is also possible to control the voltage across the resonant elements, particularly the resonant capacitor C2 which is usually in parallel with the lamp, by altering the controlled (dynamic or adjustable) load on the base drive transformer T1 as a function of time. For example, suddenly dropping the load on the base drive transformer T1 will cause the frequency at which the resonant circuit is driven to drop abruptly. This in turn causes a sudden increase in voltage across the lamp 110 to create an ignition condition for the operation of the lamp 110.

Further enhancements of the present invention include adding circuitry to affect the drive transformer loading during the normal lamp operation to result in effects such as an output voltage control during lamp removal, lamp end of life or any other possible operational enhancements and protection schemes.

As shown in the additional embodiments below, one of the advantages of the present invention is that the invention makes it possible to control the frequency (and hence preheating and dimming) with something as simple as an R-C timing circuit in the loading circuit 140. The R-C timing circuit can provide both dynamic loading and adjustable loading.

(1) Dynamic Loading and Preheating Control

Figure 2:
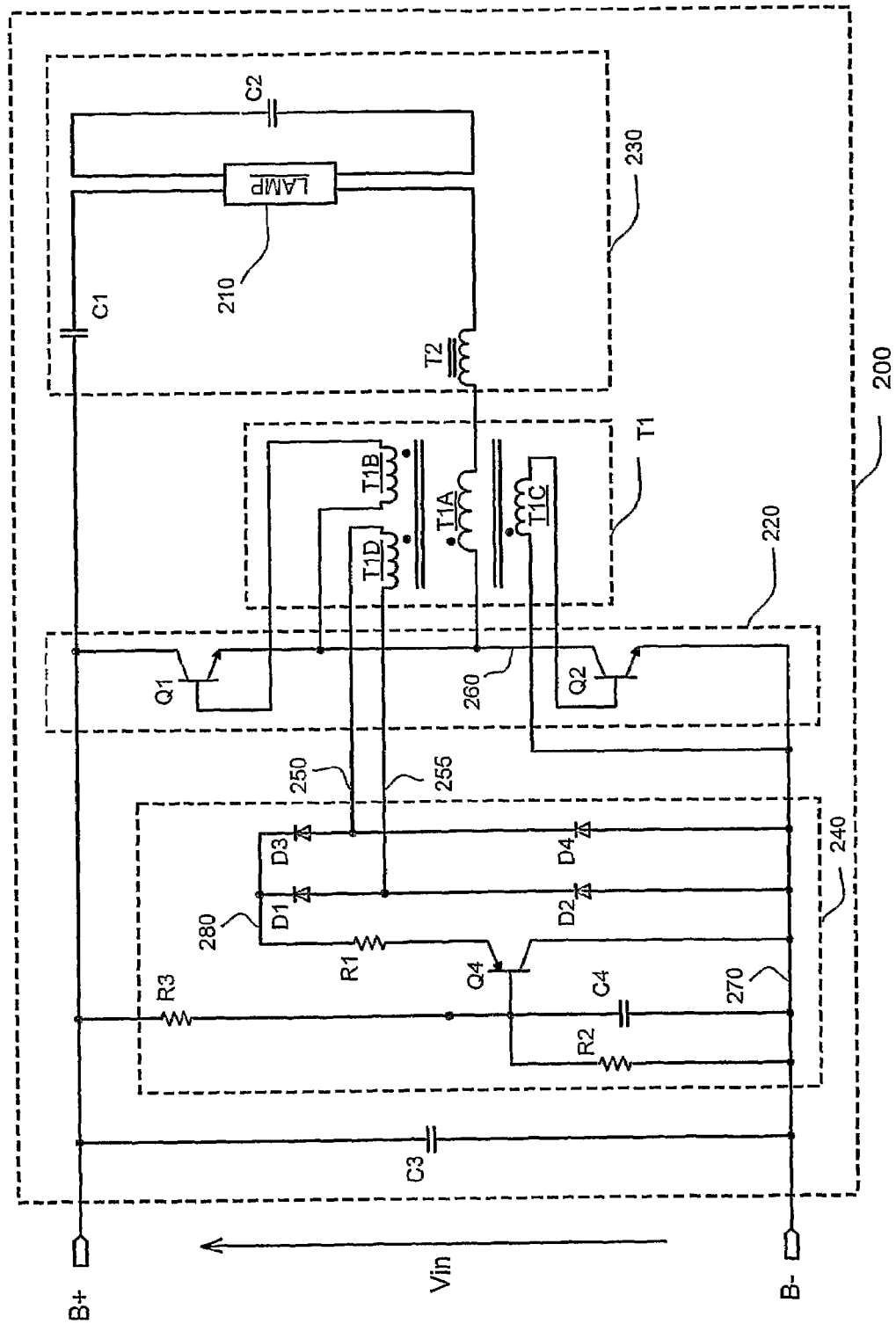
FIG. 2 shows a circuit model of a ballast having an embodiment of a dynamic loading circuit in accordance with the present invention.

FIG. 2 shows an equivalent circuit model of a ballast having an embodiment of a dynamic loading circuit in accordance with the present invention. The ballast includes a ballast circuit 200 for powering a gas discharge lamp 210. The ballast circuit 200 has positive and negative DC input terminals B+ and B− for receiving a DC supply voltage. The ballast circuit 200 includes, as represented by circuit blocks of FIG. 2, an inverter 220, a base drive transformer T1, a resonant circuit 230 and a drive transformer loading circuit 240 connected to the base drive transformer T1.

The inverter 220 is connected to the input terminals B+ and B−. The base drive transformer T1 is connected to the inverter 220 to provide a drive signal. The base drive transformer T1 includes a primary winding T1A and a secondary winding set, which in the embodiment shown in FIG. 2 includes a first secondary winding T1B base drive winding, a second secondary winding T1C base drive winding and a third secondary winding T1D. The loading circuit 240, details of which are described below, is connected through AC input terminals 250 and 255 to the third secondary winding T1D of the base drive transformer T1. The third secondary winding T1D therefore functions as a drive transformer loading winding in the embodiment shown in FIG. 2.

The switching transistors of inverter 220 as embodied in FIG. 2 are connected as a half-bridge switching transistor inverter having a first bipolar transistor Q1 connected at its collector electrode to the positive DC input terminal B+. The first bipolar transistor Q1 has an emitter electrode connected to node 260. The first secondary winding T1B is the base drive winding connected across the base-emitter junctions of the first bipolar transistor Q1. The inverter 220 also includes a second bipolar transistor Q2 having a collector electrode connected to node 260. The second bipolar transistor Q2 has an emitter electrode connected to terminal 270. The second secondary winding T1C is the base drive winding connected across the base-emitter junctions of the second bipolar transistor Q2.

The resonant circuit 230 has a DC blocking capacitor C1, a resonant capacitor C2, and a resonant inductor T2, all connected in series through the primary winding T1A of the base drive transformer T1 and placed between the DC input terminal B+ and node 160. Via node 260, the resonant circuit 230 is connected to the inverter 220. In application, the resonant circuit 230 connects directly to and powers the filaments (not shown) of a gas discharge lamp 210.

The loading circuit 240 in FIG. 2 is an exemplary embodiment of the block representation of the loading circuit 140 of FIG. 1. The loading circuit 240 has a bridge rectifier consisting of four diodes (D1, D2, D3 and D4), a loading resistor R1, a loading transistor Q4, timing resistors R2 and R3, and a timing capacitor C4. The timing circuit of R2, R3 and C4 allows the Q4 to turn off slowly. The delay in the turn-off of the loading transistor Q4 is to allow the gas discharge lamp 210 to be started up properly.

The positive DC output terminal 280 of the bridge rectifier (D1, D2, D3 and D4) is connected to the loading resistor R1. The negative DC output terminal 270 of the bridge rectifier (D1, D2, D3 and D4) is connected to the negative DC input terminal B−. The timing resistor R3 is connected to the positive DC input terminal B+ and the loading transistor Q4.

The loading circuit 240 uses a simple R-C timing circuit to provide an inherent dynamic loading property when the circuit is started. When a DC voltage $V_{in}$ is applied between the DC input terminals B− and B+, the timing capacitor C4 will be charged through the timing resistor R3. The timing resistor R2 is used to limit the highest voltage across the timing capacitor C2. The mechanism of the loading circuit 240 and the affected inverter frequencies is further shown in FIGS. 3-4 and described below.

Figure 3:
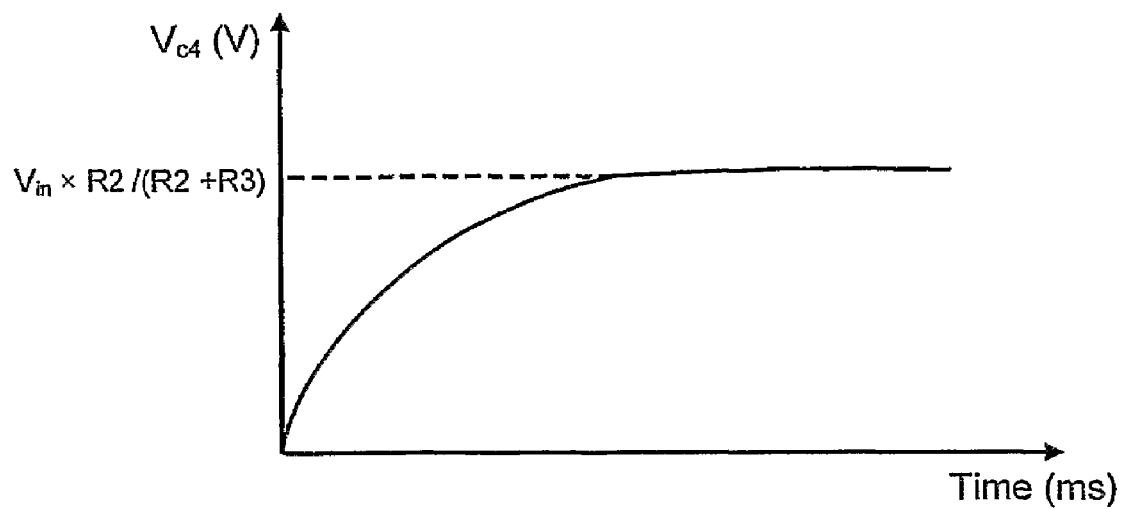
FIG. 3 shows an illustrative timing diagram of a voltage $V_{c4}$ across the timing capacitor C4 of the ballast circuit of FIG. 2.

FIG. 3 shows an illustrative timing diagram of a voltage $V_{c4}$ across the timing capacitor C4 of the ballast circuit 200 of FIG. 2. The ballast circuit 200 is turned on when a sufficiently high DC voltage is applied from B+ to B−. This may be done, for example, through another input circuitry such as a full wave rectifier from an AC source or any other common filter, rectifier and power factor correction schemes (not shown). When the ballast circuit 200 is turned on, the voltage $V_{C4}$ rises with time until it reaches $V_{in} \times R2/(R2+R3)$. The voltage $V_{Q4e}$ at the emitter of the loading transistor Q4 is approximately equal to $V_{C4}+0.7V$, and rises with time as $V_{C4}$ rises.

As $V_{Q4e}$ rises with time (as shown in FIG. 3), the voltage $V_{280}-V_{Q4e}$ applied over the loading resistor R1 generally descends ($V_{280}$ is the voltage across the DC output terminal 280 and $V_{Q4e}$ is the voltage across the emitter of the loading transistor Q4). The exact timing characteristics of the voltage $V_{280}-V_{Q4e}$ is complicated because $V_{280}$ also changes with time. As $V_{280}$ approaches $V_{Q4e}$, the current through the loading resistor R1 IR1 approaches zero. If $V_{280}$ becomes less than $V_{Q4e}$, IR1 is zero and no current will be delivered from the loading winding T1D. In addition, the current running through the primary winding T1A will also limit the maximum current of IR1.

Although it is not simple (and not critical) to describe exactly how the above voltages and current vary, it is appreciated that during a startup, the loading transistor Q4 will be on initially (and the loading resistor R2 be thus connected to the terminal B−1), and subsequently turned off after an initial period of time, resulting in an increase of the effective loading impedance across the loading winding T1D. The overall effect is that the additional loading applied by the loading winding T1D decreases dynamically with time after the ballast circuit 200 is turned on. As further described herein, this initial period of time, during which the loading impedance across the loading winding T1D is relatively low (while the loading saturation and the corresponding switching frequency are relatively high), can be used as preheating time.

Figure 4:
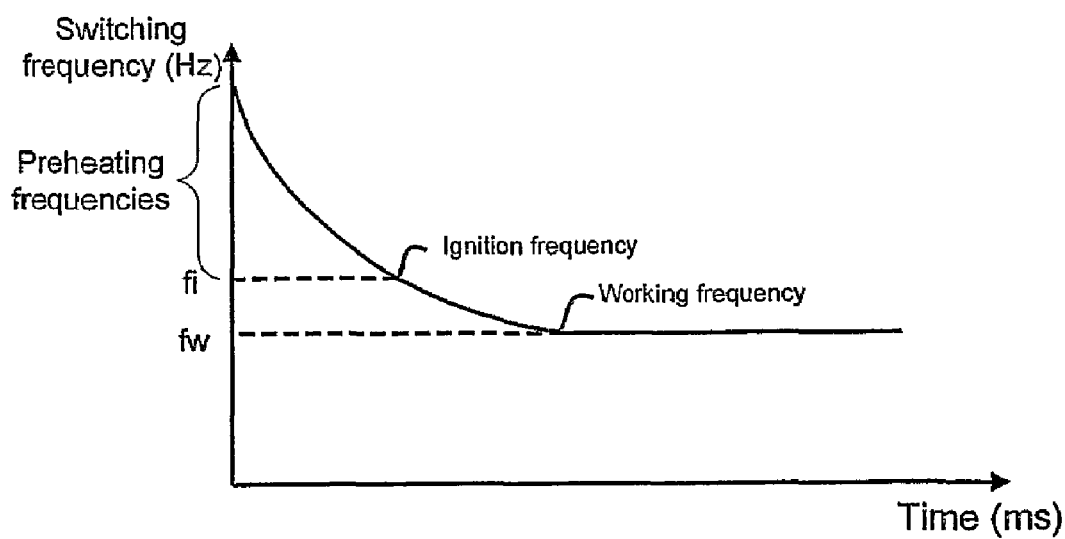
FIG. 4 shows an illustrative timing diagram of the switching frequency of the ballast circuit shown in FIG. 2.

FIG. 4 shows an illustrative timing diagram of the switching frequency of the ballast circuit 200 shown in FIG. 2. Because the loading impedance across the loading winding T1D increases dynamically with time after the ballast circuit 200 is turned on, the switching frequency of the ballast circuit 200 decreases dynamically with time. As discussed above, when there is sufficient additional loading applied by the loading winding T1D, the base drive transformer T1 will saturate, resulting in a switching frequency in the ballast circuit 200 higher than the natural resonant frequency of the resonant circuit 230. The switching frequency of the ballast circuit 200 decreases when the additional loading applied by the loading winding (the third secondary winding) T1D of the base drive transformer T1 becomes lower.

As further shown in FIG. 4, the switching frequency of the ballast circuit 200 is relatively high in an initial period of time after the ballast circuit 200 has been started. At least a portion of initial period may be used for preheating, and the corresponding frequencies may be called preheating frequencies. By the time the switching frequency drops sufficiently low to allow the resonant circuit to generate the ignition voltage (shown as ignition frequency fi in FIG. 4), the filaments of the lamp 210 have been sufficiently preheated to the desired temperature for ignition. After ignition, the switching frequency continues to drop until it reaches the desired working frequency fw.

The above is a dynamic process inherent to the ballast circuit 200. The dynamic process occurs automatically when the ballast circuit 200 is turned on. The detailed features of this dynamic process are determined by the specific design, including the values of the physical properties (such as resistors and capacitors) of the components of the circuit. In designing the ballast circuit 200 in accordance with the present invention, the value of the loading resistor R1 and the number of turns (N) of the windings T1D may be carefully selected to achieve a desired range of the preheating frequencies, while the value of the timing capacitor C4 may be selected to achieve a desired preheating time and preheating duration.

Figure 5:
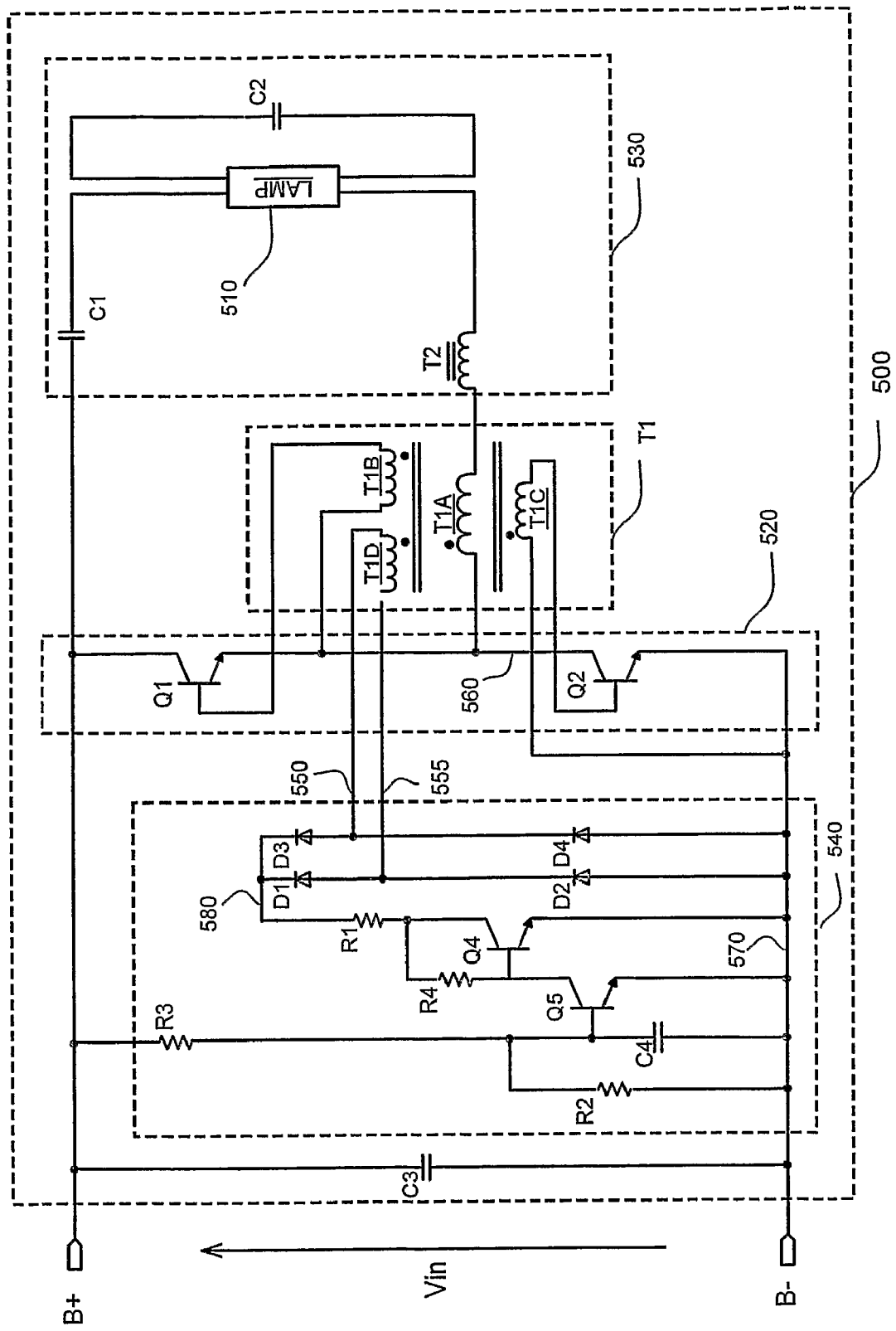
FIG. 5 shows a circuit model of a ballast having another embodiment of a dynamic loading circuit in accordance with the present invention.

FIG. 5 shows a circuit model of a ballast having another embodiment of a dynamic loading circuit in accordance with the present invention. The ballast circuit 500 has a loading circuit 550 which is a variation/modification of the dynamic loading circuit 240 in the ballast circuit 200 of FIG. 2. The ballast circuit 500 powers a gas discharge lamp 510. In addition to the positive and negative DC input terminals B+ and B− for receiving a DC supply voltage, the ballast circuit 500 includes, as represented by circuit blocks of FIG. 5, an inverter 520, a base drive transformer T1, a resonant circuit 530 and the loading circuit 540 connected to the base drive transformer T1.

In contrast to the dynamic loading circuit 240 in FIG. 2, the timing circuit in 540 uses two NPN transistors (Q4 and Q5) instead of one PNP transistor. The loading circuit 540 has a bridge rectifier (D1, D2, D3 and D4), a loading resistor R1, a bias resistor R4, enabling transistors Q4 and Q5, timing resistors R2 and R3, and a timing capacitor C4.

The loading circuit 540 uses a simple R-C timing circuit to provide an inherent dynamic loading property when the circuit is started. The mechanism of the loading circuit 540 is shown in FIGS. 6-7 and described below.

Figure 6:
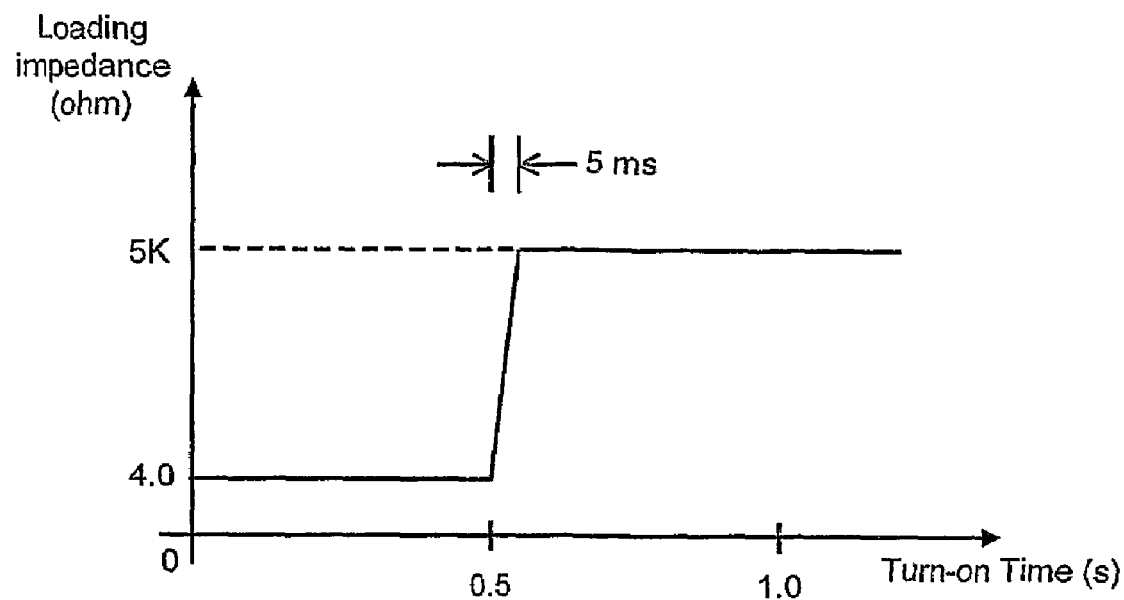
FIGS. 6-7 show timing diagrams of the loading impedance and switching frequency of an exemplary ballast circuit based on the ballast circuit of FIG. 5.
Figure 7:
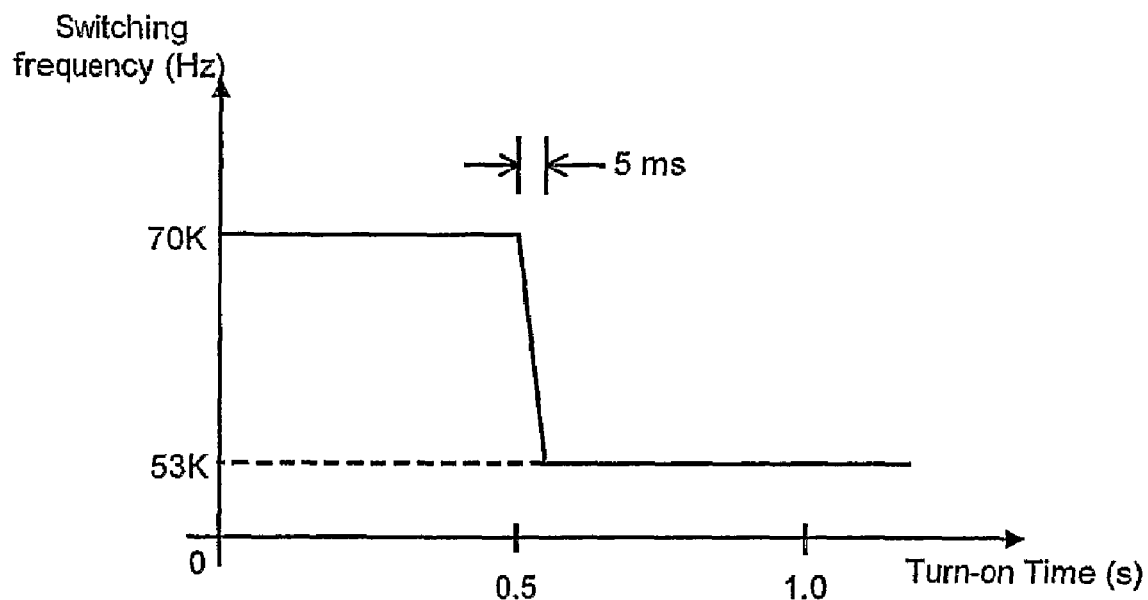

FIGS. 6-7 show timing diagrams of the loading impedance and switching frequency of an exemplary ballast circuit built based on the ballast circuit 500 of FIG. 5. When a DC voltage $V_{in}$ is applied between the DC input terminals B− and B+, the transistor Q4 turns on; the initial loading impedance across the loading winding T1D is equal to R1. The timing capacitor C4 is charged through the timing resistor R3. This corresponds to an initial period of time of about 0.5 seconds characterized by relatively higher switching frequencies as shown in FIG. 7. During this initial period of time, the loading impedance across the loading winding T1D is low and the loading winding T1D applies a sufficiently high loading to the base drive transformer T1 to saturate the transformer T1 (FIG. 6).

The timing resistor R2 limits the highest voltage across the timing capacitor C4. When the voltage across the timing capacitor C4 is high enough to turn on the transistor Q5, the bias resistor R4 will be pulled to B−. This turns off the transistor Q4. As a result the loading impedance will be now equal to R1+R4 (reflecting an increase from the initial value of R1). The increase of the loading impedance results in less loading and moves the base drive transformer T1 away from a saturated condition. This is reflected by a drop of switching frequency as shown in FIG. 7.

The data shown in FIGS. 6-7 is typical of a ballast for a compact fluorescent lamp, with a preheating duration of about half a second, and an ignition time that lasts about 5 ms. During the startup, the switching frequency changes from 70 kHz to 53 kHz.

It is understood that the dynamic loading circuits 240 in FIGS. 2 and 540 in FIG. 5 are just examples of the dynamic loading circuits that can be employed to control the startup of a gas discharge lamp in accordance with the present invention. It is further understood that the components of the inverter 220 and the resonant circuit 230 can be reconfigured in many ways. For example, the DC blocking capacitor C1, the resonant capacitor C2 and the resonant inductor T2 can be arranged in any order.

In an alternative embodiment, the resonant circuit 230 can be returned to the terminal B− instead of B+. In another embodiment, the AC input (at 250 and 255) of the loading circuit 240 can be returned to the ballast circuit 200 through a diode, which is common in phase control or power factor corrected circuits.

(2) Adjustable Loading and Dimming Control

A slight modification to dynamic loading circuit 240 in the ballast circuit 200 of FIG. 2 may realize an adjustable loading circuit used for purposes other than the startup of the lamp, such as a dimming function during normal operation.

Figure 8:
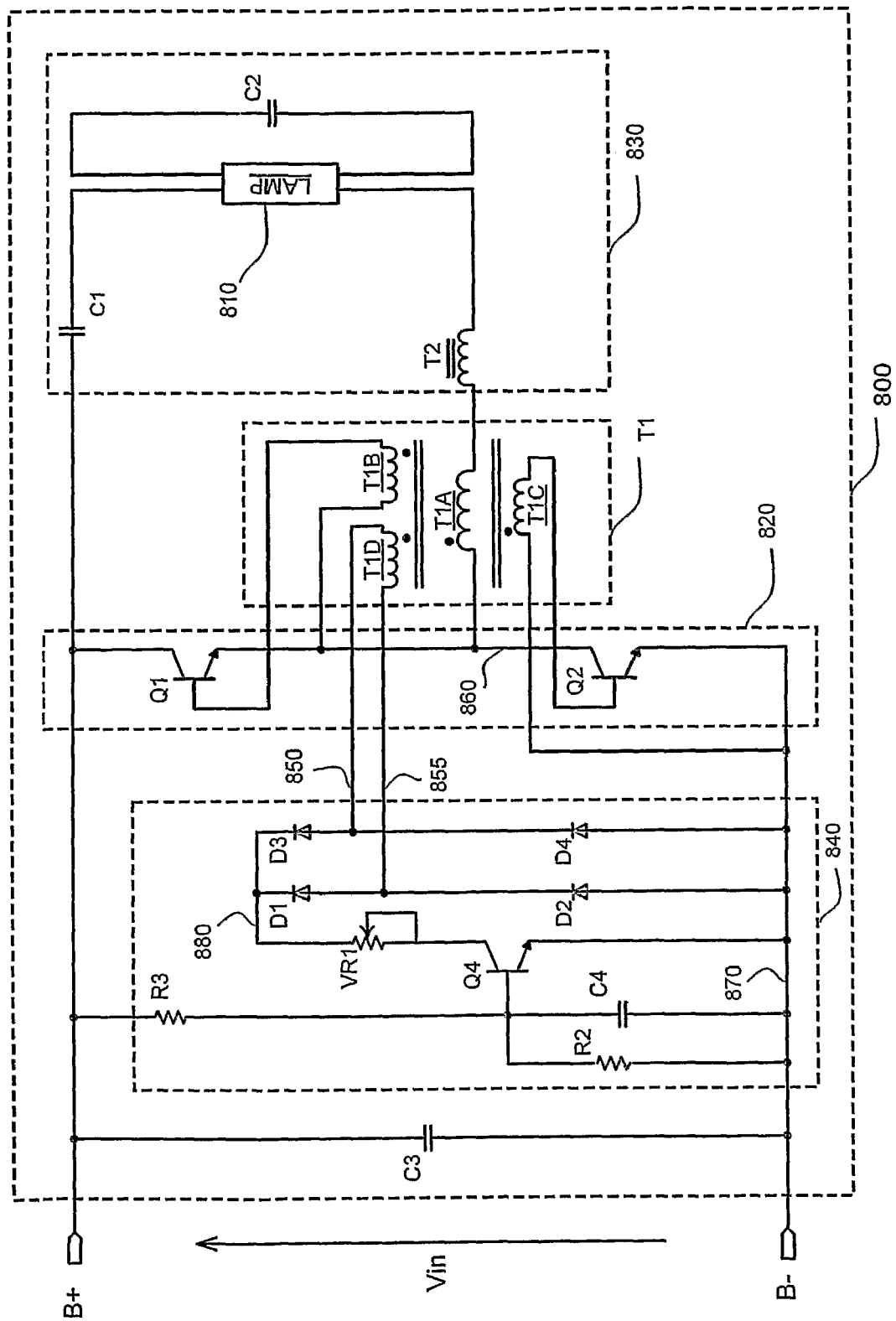
FIG. 8 shows a circuit model of a ballast having an embodiment of an adjustable loading circuit for dimming control in accordance with the present invention.

FIG. 8 shows an equivalent circuit model of a ballast having an embodiment of an adjustable loading circuit for dimming control in accordance with the present invention. The ballast includes a ballast circuit 800 for powering a gas discharge lamp 810. The overall circuit design of the ballast circuit 800 is similar to that of the ballast circuit 200 of FIG. 2. In addition to the positive and negative DC input terminals B+ and B− for receiving a DC supply voltage, the ballast circuit 800 includes, as represented by circuit blocks of FIG. 8, an inverter 820, a base drive transformer T1, a resonant circuit 830 and a loading circuit 840 connected to the base drive transformer T1.

In contrast to the dynamic loading circuit 240 in FIG. 2, the adjustable loading circuit 840 uses a potentiometer having a variable resistor VR1 connected to the DC output terminal 880 of the bridge rectifier (D1, D2, D3 and D4). In addition, the loading transistor Q4 in the adjustable loading circuit 840 of FIG. 8 is a NPN transistor instead of a PNP transistor as in the loading circuit 200 of FIG. 2.

After power is applied to the ballast circuit 800 and the loading transistor Q4 is biased on, the variable resistor VR1 can be adjusted to make the effective load applied by the loading circuit 840 an adjustable load. Specifically, by adjusting the variable resistor VR1 (which can be accomplished with a simple potentiometer), the loading circuit 840 applies an adjustable load which is capable of controlling the saturation of the base drive transformer T1 to result in variable oscillating frequency, which in turn results in an adjustable power output of the gas discharge lamp 810. The characteristics of the ballast circuit 800 having the adjustable loading circuit 840 are further illustrated in FIGS. 9-12 and described below.

Figure 9:
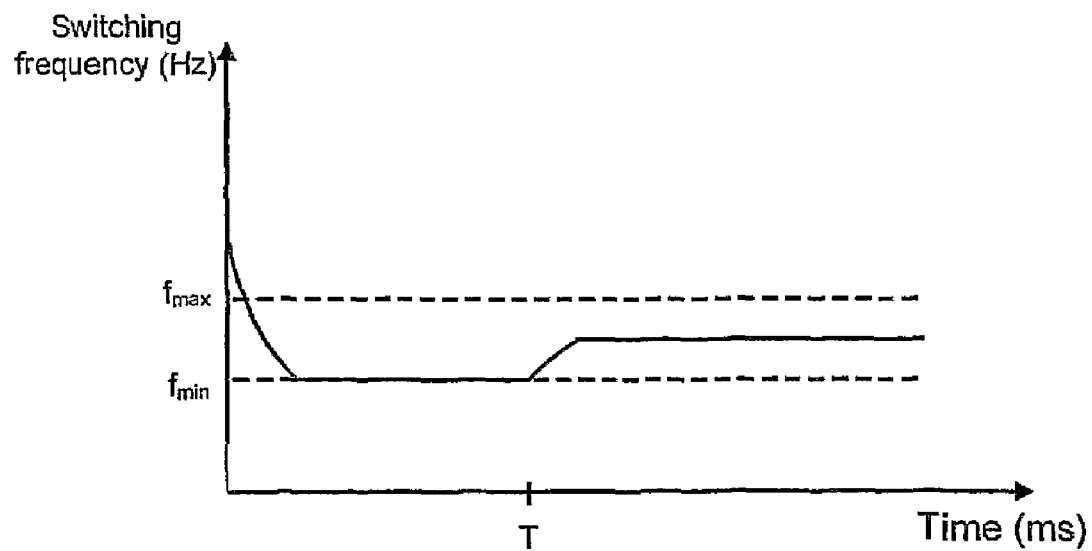
FIG. 9 shows an illustrative timing diagram of a switching frequency of the ballast circuit of FIG. 8.

FIG. 9 shows an illustrative timing diagram of the switching frequency of the ballast circuit 800 of FIG. 8. T denotes the delay time to turn on the NPN loading transistor Q4 in FIG. 8 after the $V_{in}$ in FIG. 8 has been applied. During the delay time T, the NPN loading transistor Q4 is off and the variable resistor VR1 is effectively electrically disconnected. After the delay time T, the NPN loading transistor Q4 is on, and the variable resistor VR1 is electrically connected across the loading winding T1D to allow adjustable loading. The duration of the delay time T is controlled by an R-C timing circuit having R2, R3 and C2 in the adjustable loading circuit 840. The delay time T allows the ballast circuit 800 to turn on normally during a startup.

After loading transistor Q4 has been turned on a loading current, IVR1, is delivered from the loading winding T1D of the base drive transformer T1. The value of IVR1 is inversely proportional to the value of VR1. At the same time, the current through the primary winding T1A also limits the maximum current of IVR1. By controlling the value of VR1, the switching frequency of the ballast circuit 800 can be adjusted within the range Of $f_{max}$ and $f_{min}$, which are the highest frequency and lowest switching frequency respectively that can be achieved by adjusting the potentiometer VR1. This is further illustrated in FIGS. 10-11.

Figure 10:
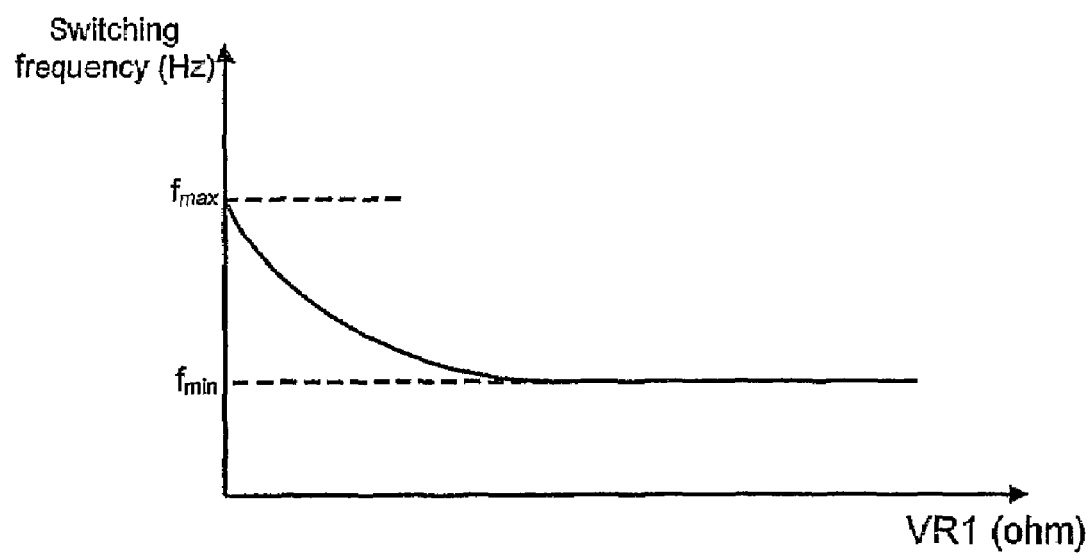

FIG. 10 shows an illustrative diagram of the relationship between the switching frequency of the ballast circuit 800 of FIG. 8 and the resistance value of the variable resistor VR1 after the loading transistor Q4 is turned on.

Figure 11:
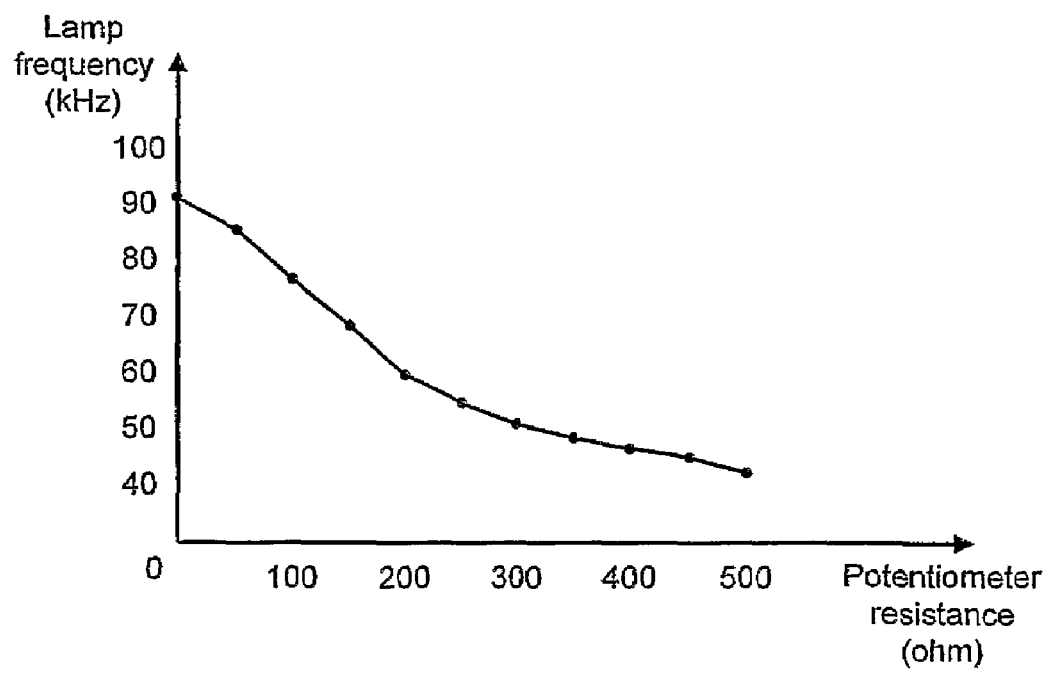
FIG. 11 shows a diagram of a measured relationship between the lamp frequency and potentiometer resistance of an exemplary ballast circuit based on the ballast circuit of FIG. 8.

FIG. 11 shows a diagram of a measured relationship between the lamp frequency and potentiometer resistance of an exemplary ballast circuit built based on the ballast circuit 800.

From both FIGS. 10-11, it can be seen that the switching frequency decreases as the value of the variable resistor VR1 (or the potentiometer resistance) increases.

Figure 12:
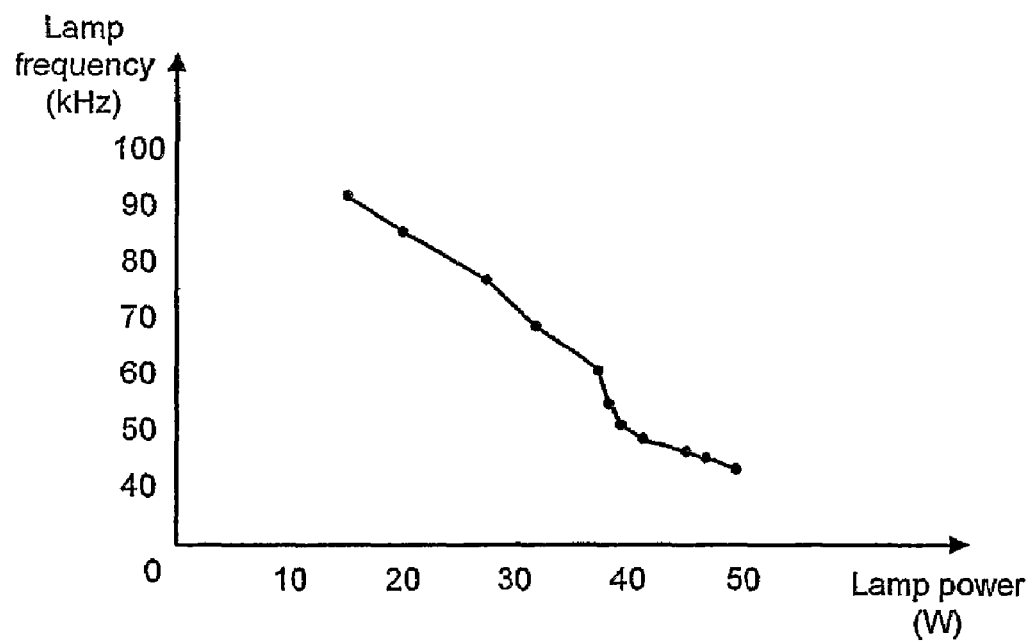
FIG. 12 shows a diagram of a measured relationship between the lamp frequency and the lamp output power of an exemplary ballast circuit based on the ballast circuit of FIG. 8.

FIG. 12 shows a diagram of a measured relationship between the lamp frequency and the lamp output power of an exemplary ballast circuit built based on the ballast circuit 800. As the switching frequency of the ballast circuit 800 decreases, the light output of the lamp 810 increases, and vice versa. Therefore, by adjusting the value of the adjustable resistor VR1, the ballast switching frequency and hence the light output of the lamp 810 can be adjusted. If the assembly of the ballast circuit 800 and the gas discharge lamp 810 is configured to start normally at the highest output level of the lamp 810, adjusting the variable resistor VR1 would perform a dimming function.

It is understood that the adjustable load circuit in FIG. 8 is just an example of the adjustable load circuits that can be employed to fulfill this dimming application in accordance with the present invention.

It is further understood that the components of the inverter 820 and the resonant circuit 830 can be reconfigured in many ways. For example, the three main resonant components (the DC blocking capacitor C3, the resonant capacitor C4 and the resonant inductor T2) can be arranged in any order.

In an alternative embodiment, the resonant circuit 830 can be returned to the terminal B− instead of B+. In another embodiment, the AC input (at 850 and 855) can be returned to the ballast through a diode, which is common in phase control or power factor corrected circuits.

Further control enhancements can also be made by implementing control of the dynamic load by much more complex control circuitry such as is common in digital energy management systems where digital and analog control signals are sent and received by circuits which can then affect control over the dynamic load. These signals may be sent to the ballast by any number of methods known in the industry, including but not limited to, power line carrier, digital and analog control schemes such as DALI and 0 to 10 volt systems, and even low power RF.

The ballast circuit in accordance with the present invention thus can be used for controlling preheating, ignition and/or dimming of a gas discharge lamp such as a compact fluorescent lamp. The ballast circuit in accordance with the present invention may be configured to perform various combinations of the features disclosed herein, including preheating and ignition but not dimming, dimming but not preheating and ignition (in which case another circuit may be required for preheating and ignition), and both preheating/ignition and dimming. The inventive ballast circuit provides a simple and low-cost dynamic and/or adjustable frequency control to perform these functions. In contrast to conventional electronic ballast circuits which rely on linear performance of the transformers and complicated frequency control circuits to change frequencies, the present invention takes advantage of the non-linear properties of a drive transformer in a saturated condition to alter the drive signals, thereby allowing the circuit to oscillate at frequencies other than the natural resonant frequency of the resonant circuit.

In the foregoing specification, the present disclosure is described with reference to specific embodiments thereof, but those skilled in the art will recognize that the present disclosure is not limited thereto. Various features and aspects of the above-described disclosure may be used individually or jointly. Further, the present disclosure can be utilized in any number of environments and applications beyond those described herein without departing from the broader spirit and scope of the specification. We claim all such modifications and variations that fall within the scope and spirit of the claims below. The specification and drawings are, accordingly, to be regarded as illustrative rather than restrictive. It will be recognized that the terms "comprising," "including," and "having," as used herein, are specifically intended to be read as open-ended terms of art.

The invention claimed is:

1. A ballast circuit for controlling a ballast of a gas discharge lamp such as a compact fluorescent lamp, the ballast circuit comprising:
   a pair of input terminals for receiving a supply voltage;
   an inverter connected to the input terminals;
   a base drive transformer connected to the inverter to provide a drive signal, the base drive transformer including a primary winding and a secondary winding set;
   a resonant circuit connected to the inverter, the resonant circuit being adapted for electrically connecting to the gas discharge lamp; and
   a loading circuit connected to the base drive transformer, the loading circuit being adapted for at least temporarily saturating the base drive transformer and thus effecting in the resonant circuit an oscillating frequency different from a natural resonant frequency of the resonant circuit.

2. The ballast circuit of claim 1 wherein the loading circuit applies a dynamic load changing with time during a startup of the ballast circuit.

3. The ballast circuit of claim 1 wherein the loading circuit applies a dynamic load which saturates the base drive transformer during an initial portion of the startup of the ballast circuit to result in an oscillating frequency changing from $f_{max}$ to $f_{min}$ in the resonant circuit, wherein at least $f_{max}$ is higher than the natural resonant frequency $f_0$ of the resonant circuit.

4. The ballast circuit of claim 1 wherein the loading circuit applies a dynamic load changing with time during a startup of the ballast circuit, the startup including a preheating period and a subsequent ignition stage, during which preheating period the dynamic load controls saturation of the base drive transformer while the resonant circuit generates a filament current in filaments of the gas discharge lamp to preheat the filaments to a sufficient temperature for lamp ignition.

5. The ballast circuit of claim 1 wherein the loading circuit applies an adjustable loading during an operation stage of the gas discharge lamp to perform a dimming function.

6. The ballast circuit of claim 5 wherein the adjustable loading is adjusted by changing resistance of a variable resistor or a potentiometer or by changing a control voltage in the loading circuit.

7. The ballast circuit of claim 1 wherein the secondary winding set of the base drive transformer comprises a secondary winding subset and a separate loading winding, the loading winding being connected to the loading circuit.

8. The ballast circuit of claim 7, wherein the inverter is a switching transistor inverter comprising a first bipolar transistor and a second bipolar transistor, and wherein the secondary winding subset comprises a first secondary winding connected to the first bipolar transistor and a second secondary winding connected to the second bipolar transistor.

9. The ballast circuit of claim 1 wherein the inverter is a half-bridge switching transistor inverter.

10. The ballast circuit of claim 1 wherein the loading circuit comprises an R-C timing circuit having a timing resistor R and a timing capacitor C, and the secondary winding set of the base drive transformer comprises a separate loading winding having N turns, the values of R, C and N being determined according to desired startup timing characteristics of the ballast circuit.

11. The ballast circuit of claim 1 wherein the supply voltage received at the input terminals is a DC supply voltage.

12. A ballast circuit for controlling operation of a gas discharge lamp such as a compact fluorescent lamp, the ballast circuit comprising:
an inverter connected to a pair of input terminals for receiving a supply voltage;
a base drive transformer connected to the inverter to provide a drive signal, the base drive transformer including a primary winding and a plurality of secondary windings;
a resonant circuit connected to the inverter, the resonant circuit being adapted for electrically connecting to the gas discharge lamp; and
a loading circuit connected to the base drive transformer, wherein the loading circuit applies an adjustable load which at least partially saturates the base drive transformer to result in an oscillating frequency changeable from $f_{max}$ to $f_{min}$ in the resonant circuit and a corresponding power output of the gas discharge lamp ranging from $P_{min}$ to $P_{max}$.

13. The ballast circuit of claim 12 wherein the plurality of secondary windings comprises a first secondary winding, a second secondary winding and a third secondary winding, the third secondary winding being connected to the loading circuit.

14. The ballast circuit of claim 12 wherein the loading circuit applies a dynamic load to at least temporarily saturate the base drive transformer during a lamp startup to preheat and ignite the gas discharge lamp.

15. The ballast circuit of claim 12 wherein the loading circuit comprises an R-C timing circuit having a potentiometer through which the adjustable load is adjusted.

16. The ballast circuit of claim 12 wherein the adjustable loading is adjusted by changing a control voltage in the loading circuit.

17. The ballast circuit of claim 12 wherein the adjustable loading is manually adjusted to perform a dimming function.

18. A gas discharge lamp assembly comprising:
a gas discharge lamp; and
a ballast circuit for controlling preheating, ignition and normal operation of the gas discharge lamp, the ballast circuit comprising:
a pair of input terminals for receiving a supply voltage;
a switching transistor inverter connected to the input terminals;
a base drive transformer connected to the switching transistor inverter to provide a drive signal, the base drive transformer including a primary winding and a plurality of secondary windings;
a resonant circuit connected to the switching transistor inverter, the resonant circuit being adapted for electrically connecting to the gas discharge lamp; and
a loading circuit connected to the base drive transformer, wherein the loading circuit applies a dynamic load which saturates the base drive transformer during an initial portion of a startup of the ballast circuit to result in an oscillating frequency changing from $f_{max}$ to $f_{min}$ in the resonant circuit, wherein at least $f_{max}$ is higher than a natural resonant frequency of the resonant circuit.

19. The gas discharge lamp assembly of claim 18 wherein the gas discharge lamp is a fluorescent lamp.

20. The gas discharge lamp assembly of claim 18 wherein the loading circuit applies an adjustable loading during an operation stage of the gas discharge lamp to perform a dimming function.

21. A gas discharge lamp assembly comprising:
a gas discharge lamp; and
a ballast circuit for controlling preheating, ignition and normal operation of the gas discharge lamp, the ballast circuit comprising:
a pair of input terminals for receiving a supply voltage;
a switching transistor inverter connected to the input terminals;
a base drive transformer connected to the switching transistor inverter to provide a drive signal, the base drive transformer including a primary winding and a plurality of secondary windings;
a resonant circuit connected to the switching transistor inverter, the resonant circuit being adapted for electrically connecting to the gas discharge lamp; and
a loading circuit connected to the base drive transformer, wherein the loading circuit applies an adjustable load which at least partially saturates the base drive transformer to result in an oscillating frequency changeable from $f_{max}$ to $f_{min}$ in the resonant circuit and a corresponding power output of the gas discharge lamp ranging from $P_{min}$ to $P_{max}$.

* * * * *